(12) United States Patent
Takahashi et al.

(10) Patent No.: US 8,128,468 B2
(45) Date of Patent: Mar. 6, 2012

(54) GAME DEVICE, INPUT METHOD AND INPUT PROGRAM FOR GAME DEVICE

(75) Inventors: Hiroyuki Takahashi, Tokyo (JP); Shugo Takahashi, Tokyo (JP); Yusuke Sugimoto, Tokyo (JP); Tetsuya Chiba, Tokyo (JP)

(73) Assignee: Camelot Co., Ltd., Tokyo (JP)

( * ) Notice: Subject to any disclaimer, the term of this patent is extended or adjusted under 35 U.S.C. 154(b) by 431 days.

(21) Appl. No.: 12/302,417

(22) PCT Filed: May 28, 2007

(86) PCT No.: PCT/JP2007/060843
§ 371 (c)(1),
(2), (4) Date: Jun. 24, 2009

(87) PCT Pub. No.: WO2007/139075
PCT Pub. Date: Dec. 6, 2007

(65) Prior Publication Data
US 2010/0069153 A1    Mar. 18, 2010

(30) Foreign Application Priority Data

May 26, 2006   (JP) ................................. 2006-146478

(51) Int. Cl.
*A63F 13/06* (2006.01)
(52) U.S. Cl. ..................... 463/3; 463/7; 463/32; 463/37
(58) Field of Classification Search ..................... 463/32, 463/31, 2, 3, 4, 7, 30, 37
See application file for complete search history.

(56) References Cited

U.S. PATENT DOCUMENTS

| | | | |
|---|---|---|---|
| 6,217,444 B1 * | 4/2001 | Kataoka et al. | 463/3 |
| 6,626,756 B2 * | 9/2003 | Sugimoto | 463/3 |
| 7,887,402 B2 * | 2/2011 | Suzuki et al. | 463/3 |
| 2004/0180709 A1 * | 9/2004 | Takahashi et al. | 463/3 |
| 2004/0214623 A1 * | 10/2004 | Takahashi et al. | 463/2 |

FOREIGN PATENT DOCUMENTS

| | | |
|---|---|---|
| JP | 2001-190837 A | 7/2001 |
| JP | 2004-216165 A | 8/2004 |
| JP | 2004-267477 A | 9/2004 |
| JP | 2004-290657 A | 10/2004 |

* cited by examiner

*Primary Examiner* — Peter DungBa Vo
*Assistant Examiner* — Damon Pierce
(74) *Attorney, Agent, or Firm* — Maier & Maier, PLLC

(57) ABSTRACT

The icon 348 of a graphic user interface indicates the magnitude of an inputted impact by an impact pointer 348*d* which moves as the time elapses and receives input of the impact. Magnitude of the impact received by a GUI 34 is retained in the impact data as a product of the moving amount of the impact pointer 348*d* and a scale factor, of which the value can be switched together with the indication form of a gauge 348*c* depending on the movement of a slider 348*a*. Consequently, more realistic regulation of impact, e.g., half shot, can be attained when a ball is hit in a sport simulation game such as a golf game.

12 Claims, 6 Drawing Sheets

GAME DEVICE, INPUT METHOD AND INPUT PROGRAM FOR GAME DEVICE

RELATED APPLICATIONS

This application claims priority, under 35 U.S.C. §119, to International Patent Application No.: PCT/JP2007/060843, filed on May 28, 2007, which claims priority to Japanese patent application No.: JP 2006-146478, filed May 26, 2006, the disclosures of which are incorporated by reference herein in its entirety.

FIELD OF THE INVENTION

The present invention relates to a game device, an input method and an input program for the game device which receives user operation and has the game proceed with players or other objects displayed in a screen, for example, when playing with a 3D scene of a sports game such as a golf game, a tennis game or a baseball game, or a 3D scene of a role playing game.

BACKGROUND ART

Conventionally, television games have been developed in many ways, for example, as home video game dedicated machines, coin-operated arcade game machines and the like, and also as game software which can be run by a general-purpose computer such as a personal computer. On the other hand, with the recent advances in the communications infrastructures, game programs provided through a communication network such as the Internet have become popular as distributed by the so-called online gaming services, which are taking place the conventional distribution through recording mediums such as CD-ROM.

One of the above games is a sports simulation game such as a golf game which proceeds on various conditions as given, for example, the shooting direction, the magnitude of impact, the strike point and other set values relating to the operation of the player, which are input when a player makes a shot. These various conditions are input through a graphic user interface (GUI) displayed in a screen with an input interface such as a mouse or a controller of the game device.

Meanwhile, in the case of sports simulation games, a variety of GUIs have been developed and proposed. For example, the above various conditions (data) such as input timing are changed in accordance with the skill of the player in order to make the game more exciting, as described in Patent Document 1.

The technique as described in this Patent Document 1 makes use of a power gauge (input object) as a GUI for determining the power and accuracy of a shot. This power gauge is, for example, a beltlike gauge which is displayed in the lower portion of the game screen and extending in the right and left direction, and provided with a scroll bar which moves as time goes on, when making a shot to indicate the magnitude of impact for the shot by the position of the scroll bar. Also, this power gauge is provided with an impact zone, which indicates the best timing point at the center position thereof, for the purpose of determining the accuracy of the shot.

Then, in the technique disclosed in Patent Document 1, when the initial operation (first operation) is done by a player with a controller connected to the game device, the game device controls the scroll bar to move at a constant speed from the position corresponding to a power level of "0%" to the position corresponding to a power level of "100%". Next, the player performs the second operation of the controller in the timing the scroll bar reaches the position corresponding to a desired power level. When the second operation of the controller is performed, the power level is set in correspondence with this timing as the power level which is input and determined by the player. The player (character) as displayed in the screen performs a shooting motion in accordance with this power level. By this configuration, the golf ball shot by the character is controlled and displayed in order that it flies the distance corresponding to the magnitude of impact in the direction corresponding to the various conditions as input.

Patent Document 1: Japanese Patent Published Application No. 2004-216165

DISCLOSURE OF THE INVENTION

Problems to be Solved by the Invention

Meanwhile, in the case of a sport such as actual golf played by striking a ball, the player not always makes a full shot (full swing), but sometimes makes a half shot (half swing) or a quarter shot (quarter swing), so that he often starts swing after rectifying the swing form to restrict the maximum motion of the swing in advance.

However, in the case of the technique disclosed in the above Patent Document 1, there is a problem in that the scroll bar of the power gauge is necessarily moved from the position corresponding to a power level of "0%" to the position corresponding to a power level of "100%" in relation to the power level for full swing, and thereby it is difficult to adjust the magnitude of impact in a realistic situation.

In order to solve the problem as described above, it is an object of the present invention to provide a game device, an input method and an input program of the game device for receiving user operation and having a simulation game such as a golf game proceed with players, a ball or other objects, in which when striking a ball during playing the game, it is possible to adjust the magnitude of impact in a more realistic manner, e.g., by making a swing after setting the maximum motion in advance such as making a half or quarter shot.

Means to Solve the Problems

In order to accomplish the object as described above, the present invention provides a game device for proceeding with a game by inputting an operation relating to an object displayed in a screen, comprising: a user interface control unit configured to control a graphic user interface which is arranged in the screen and used to display information about the game and input the operation to the game; and an object control unit configured to change the position coordinates of the object in a 3D space in accordance with stroke data which is input on the basis of the operation of the graphic user interface.

Particularly, the graphic user interface indicates the magnitude of impact to be input by displaying a graphic which is varying with time in order to accept the magnitude of impact. The product of the change amount of the graphic and a scale factor is input through the graphic user interface as the magnitude of impact, and stored in the stroke data, and the value of the scale factor can be switched, as well as the display type of the graphic, in response to the operation through the graphic user interface.

On the other hand, the present invention provides an input method for inputting an operation through a graphic user interface which is arranged in a screen for use in displaying information about an game and inputting operation to the game, in a game device for proceeding with the game by inputting an operation relating to an object displayed in the screen, the input method comprising:

(1) a step of switching the value of a scale factor as well as the display type of a graphic in the graphic user interface in accordance with the operation through the graphic user interface;

(2) a step of displaying a graphic which is displayed in the graphic user interface and varying with time, and accepting the magnitude of impact indicated by the graphic;

(3) a step of saving, as the magnitude of impact of stroke data, the product of the scale factor and the change amount of the graphic at the time when the magnitude of impact is accepted; and (4) a step of changing the position coordinates of the object in a 3D space in accordance with the stroke data.

In accordance with the present invention as has been discussed above, while the magnitude of impact is input in correspondence with the change amount of a graphic in a graphic user interface, it is possible to change the influence of the change amount of the graphic upon the magnitude of impact by switching the scale factor, and thereby to represent a half or quarter shot by decreasing the scale factor.

Preferably, in accordance with the above invention, the graphic is a gauge which indicates the magnitude of impact by length; the graphic user interface is provided with a target power determination unit which indicates the target value of the magnitude of impact by means of a mark on the gauge; and the value of the scale factor and the display type of the gauge are switched in accordance with the position indicated by the target power determination unit in relation to the gauge.

In this case, since the value of the scale factor can be switched by the position of the target power determination unit providing a mark on the gauge indicative of the magnitude of impact, for example, it is possible to select the scale factor corresponding to a full shot or a half shot with reference to the target value of the magnitude of impact such as the flying distance of a ball, and thereby to realize an intuitive operability.

Preferably, in accordance with the above invention, the target power determination unit provides a slider which moves along the longitudinal direction of the gauge; the value of the scale factor is switched in steps in accordance with the motion range of the slider; the change of the gauge indicative of the magnitude of impact is represented by the position of the impact pointer which is a mark indicative of the length of the gauge; the display type of the gauge is switched in order that the maximum value of the magnitude of impact corresponds to the maximum displacement of the impact pointer for each scale factor; and when inputting the magnitude of impact, the impact pointer is moving on the gauge at a constant speed for each scale factor.

In this case, since the scale factor can be easily switched by sliding the slider while the magnitude of impact is limited in the range of the maximum displacement of the impact pointer which moves on the gauge, it is possible to visually recognize the magnitude of impact to be input. Also, since the impact pointer moves on the gauge at a constant speed, the influence of the displacement of the impact pointer upon the magnitude of impact can be in proportion to the scale factor, and thereby it is possible to more finely adjust the magnitude of impact by decreasing the scale factor for a half shot or a quarter shot, and realize a realistic operational feeling.

Incidentally, the system and method of the present invention as described above can be implemented by running a program written in a predetermined language on a computer.

In addition, such a program can be stored in a computer readable medium, so that the program can be easily maintained, transported and installed.

BEST MODE FOR CARRYING OUT THE INVENTION

Configuration of 3D Game Device

Figure 1:
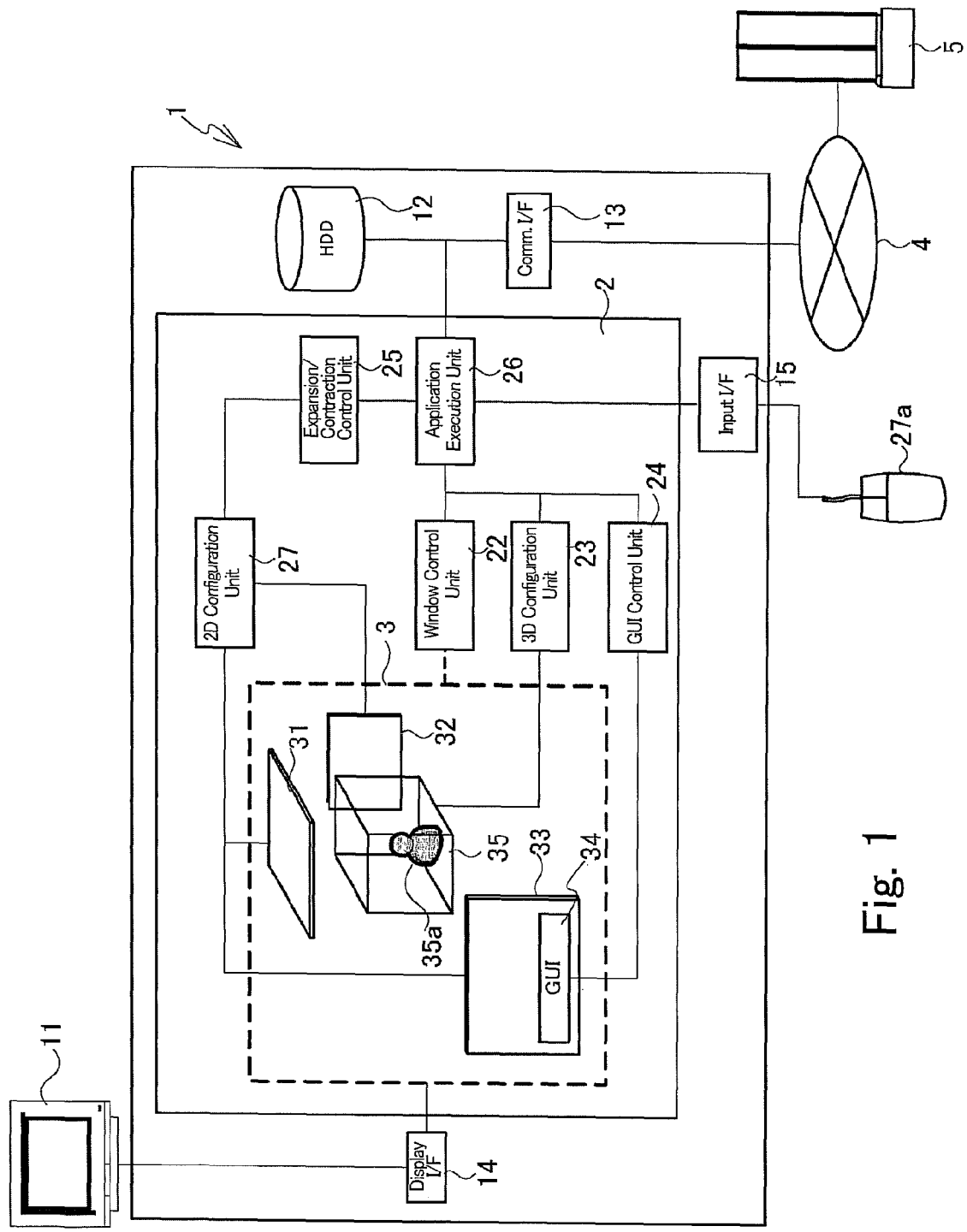
FIG. 1 is a block diagram for showing the configuration of the 3D game device in accordance with an embodiment.

An embodiment of the present invention will be explained with reference to the accompanying drawings. FIG. 1 is a block diagram which shows the configuration of the 3D game device in accordance with the present embodiment. Incidentally, the example of the present embodiment is described in the case where golf game software is run on a personal computer 1. Also, while the present invention is applied to the golf game software in the case of the present embodiment, the present invention is not limited thereto, but also applied to, for example, sports games such as a tennis game and a baseball game, role-playing games including 3D scenes, and any other game software for receiving user operation and having the game proceed with players or other objects displayed in a screen.

The 3D game device in accordance with the present embodiment is implemented with the personal computer 1 in which golf game software is run. More specifically speaking, as shown in FIG. 1, this personal computer 1 comprises a CPU 2 for performing arithmetic operations, a storage device 12 such as a hard disk for storing data and programs, a communication interface (I/F) 13 for accessing a communication network 4 such as the Internet, a display interface (I/F) 14 for connecting a display device such as a display 11, and an input interface (I/F) 15 for connecting input devices 27a such as a mouse, a keyboard and a controller.

Incidentally, the personal computer 1 of the present embodiment is capable of accessing a game server 5 through the communication network 4, and communicating with the game devices used by other users through this game server 5 such that a number of users can participate in the same game through the game server 5.

In other words, when playing the online game through this communication network 4, the respective entry players share the information of the entry players (the properties of characters to be used, the properties of items such as own clubs, or other information necessary for playing the game) and the information necessary for demonstration as delivered to the terminals of the respective entry players through the game server 5. On the other hand, the information on the 3D shapes of courses, the design of each character, texture and so forth required for the presentation of a virtual space is installed in the terminal of each user in advance. The processes of three-dimensional and two-dimensional images are performed on the user terminal side, such that the condition of each player and the progress of the game are synchronized and reflected to the user terminal on a real time base. Incidentally, during playing the game, while providing enhanced demonstration, making the scene alive and enabling the entry players to deliver and share information as talking thereamong at certain intervals, the information is shared in a simple manner during inputting a shot condition, and the input condition after finishing the input operation is completely shared through the server 5.

A variety of modules are built by driving the CPU 2 to run a golf game software. In the context of this document, the term "module" is intended to encompass any function unit capable of performing necessary operation, as implemented with hardware such as a device or an apparatus, software capable of performing the functionality of the hardware, or any combination thereof. More specifically described, the CPU 2 runs the golf game software to build a window control unit 22, a 3D configuration unit 23, a GUI control unit, an expansion/contraction control unit 25, an application execution unit 26 and a 2D configuration unit 27.

The application execution unit 26 is a module for running the golf game software to proceed with the golf game by making use of objects which are arranged in a 3D virtual space 3. More specifically speaking, the application execution unit 26 performs the progress management of the game in accordance with the rules of golf (OB is counted as one penalty stroke; when there are a plurality of players, each player make a shot in a controlled order; and so forth), the score management on the basis of progress of the golf game, and the arithmetic operation necessary for ballistic simulation of the projectile in the virtual space by calculating the condition of a ball which is struck in accordance with stroke analysis on the basis of the ability parameters of the character and the properties of items as used, such as a golf club.

Incidentally, while a virtual 3D space 35 is constructed as a three-dimensional representation to make alive the scene and the like in the case of this golf game program, since the display device the user views is two-dimensional, the interface is provided for helping the user to spatially recognize the space by automatically performing the camera work which is moved in the vertical plane along the shooting direction, representing this plane in association with a power gauge, and so forth.

Then, the golf game program receives the user operation through the application input interface 15, proceeds with the game in accordance with the condition (operation data) acquired in response to the user operation, generates display information items (3D polygons and so forth), displays the windows 31 to 33 as two-dimensional planes, and outputs sound associated with the display.

The window control unit 22 is a module for controlling the windows 31 to 33 displayed in the screen. Specifically speaking, while a virtual camera is provided for setting the field-of-view range in the 3D space 3, the objects imaged by the virtual camera are displayed in the respective windows 31 to 33 as two-dimensional planes. Meanwhile, in the case of the present embodiment, the window 33 is a main window showing a shot over the player in a full view of a golf course. The main window includes the GUI 34. Also, the window 32 is a jump window in which is imaged the location near the position a ball reaches, and the window 31 is a top window in which is imaged the golf course as a bird's-eye view.

The 3D configuration unit 23 is a module for virtually constructing the 3D space 3, and controlling the position coordinates of the objects located in the three-dimensional coordinates 35 in this virtual 3D space 3. The 2D configuration unit 27 is a module for two-dimensionally displaying the 3D space 3 in the windows 31 to 33 in accordance with the field-of-view range of each of the windows 31 to 33 on the basis of the type, area and shape of each window. The expansion/contraction control unit 25 is a module for changing the areas and shapes of the windows 31 to 33 on the basis of the operation through the input device 27a.

The GUI control unit 24 is a module for controlling the graphic user interface (GUI) 34 which is located in the windows 31 to 33 (mainly in the main window 33 in the case of the present embodiment) for displaying information about the game and enabling the user to perform operation. In the case of the present embodiment, the golf game proceeds in response to the operation of an object displayed in the display 11 through the GUI 34 by the use of the input device 27a.

Figure 2:
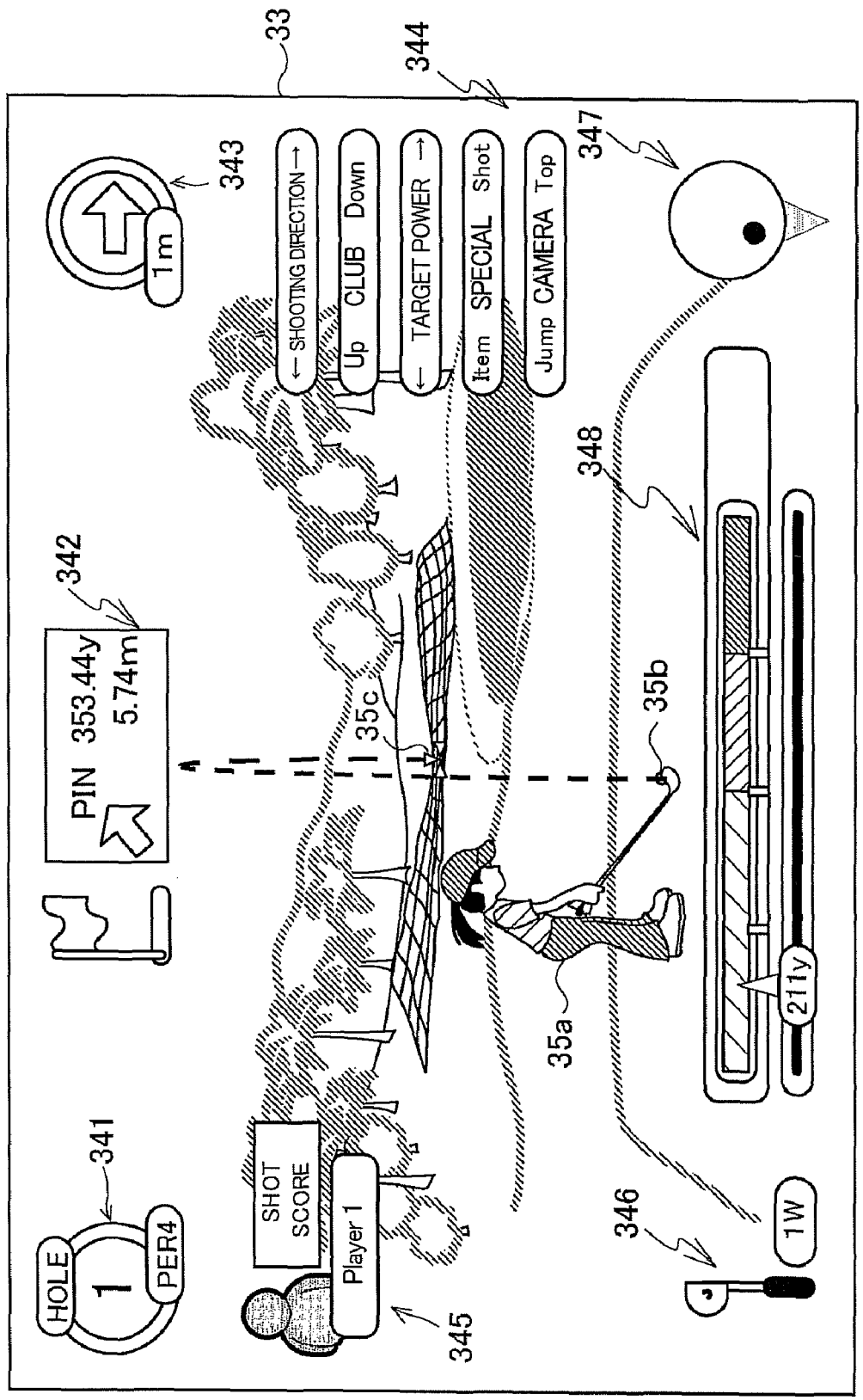
FIG. 2 is an explanatory view for showing the screen layout of the 3D game device in accordance with the embodiment.

The GUI 34 comprises graphics mainly displayed in the main window 33, for example, an icon 341 indicative of the progress of the golf game (hole number and par type), an icon 342 indicative of the distance and direction to the pin, an icon 343 indicative of how the wind blows, icons 344 indicative of the status of the player (shooting direction, club, target power, camera position, and the like), icons 345 indicative of the name and score of the player, an icon 346 indicative of the golf club the player has selected, an icon 347 indicative of the strike point of the ball, an icon 348 which is operated when striking the ball, and so forth, as illustrated in FIG. 2.

In the case of the present embodiment, as one of the user operations which are input through this input device 27a, stroke data is input when the player 35a strikes a golf ball 35b. This stroke data is input on the basis of operations on the GUI 34 (mainly, the icon 348), and thereby the position coordinates of the golf ball 35b which is one of the objects are changed in the 3D space 3.

Specifically describing the icon 348, as illustrated in FIGS. 5(a) to 5(e), the icon 348 comprises a gauge 348c which is partitioned into a plurality of areas A1 to A3, a slider 348a which slides on a guide 348b when performing a shooting motion, an impact pointer 348d which moves in the horizontal direction on the guide 348b, and a scale factor indicator 348e.

The gauge 348c is a module for displaying the magnitude of impact as input by a graphic symbol which is changed as the time passes. In the case of the present embodiment, the magnitude of impact as input is indicated by the length (scale) of this gauge 348c. The change of this gauge 348c in length is represented by the impact pointer 348d which is a mark sliding on the gauge 348c. Namely, the length (value) of the gauge 348c is defined as the distance between the right end of the gauge 348c and the impact pointer 348d, which is moved to represent the change of the gauge 348c in length.

In the shot operation mode, the impact pointer 348d starts moving on the gauge 348c in response to a shot operation start operation (for example, clicking the mouse), and continues the motion on the gauge 348c at a constant speed (as reciprocal motion, or as repeated motion in one direction) while changing the length (value) of the gauge 348c by the motion thereof. The magnitude of impact is then input in correspondence with the position of the impact pointer 348d (the distance (value) from the end of the gauge when the second click is made.

The slider 348a is a controller which slides along the guide 348b in the horizontal direction, and is moved in response to the user operation, and indicates the target value of the magnitude of impact as a mark on the gauge 348c. Also, the scale factor indicator 348e is a component for displaying the scale factor, which is currently selected, such as a half swing factor of "½" or a quarter swing factor of "¼". Incidentally, in the case of the present embodiment, a full swing factor "1" is usually not displayed.

Also, the value of the scale factor is switched in steps depending upon which of the areas A1 to A3 of the gauge 348c the slider 348a is located in. The display types of the gauge 348c and scale factor indicator 348e are switched when the scale factor is switched. The display type of the gauge 348c is switched in response to the position of the slider 348a, as illustrated in FIGS. 5(a) to 5(e), such that the maximum displacement of the impact pointer is corresponding to the maximum value of the magnitude of impact as determined according to each scale factor. For example, it is assumed that, in the case where the scale factor is "1" as shown in the same figure (a), the slider 348a located in the area A1 is moved in the rightward direction and about to enter the area A2 as shown in the same figure (b). The scale factor is then switched to "½" as shown in the same figure (c). The display of the gauge 348c is then switched such that the magnitude of impact takes the maximum value (105y) corresponding to the scale factor of "½" at the left edge of the gauge 348c, and at the same time the slider 348a jumps to the left edge of the gauge 348c and can be moved in the rightward direction in the area A2. Furthermore, when the slider 348a is about to enter the area A3 as shown in the same figure (d), the scale factor is switched to "¼" as shown in the same figure (e). The display type of the gauge 348c is then switched such that the magnitude of impact takes the maximum value (53y) corresponding to the scale factor of "¼" at the left edge of the gauge 348c, and at the same time the slider 348a jumps to the left edge of the gauge 348c and can be moved in the rightward direction in the area A3.

The impact pointer 348d is a mark which indicates the length of the gauge 348c by moving on the gauge 348c in the horizontal direction. When starting a shot operation (by making the first click), the impact pointer 348d moves on the gauge 348c at a constant speed. When making a shot (by making the second click), the magnitude of impact is input in correspondence with the distance between the right end of the gauge 348c and the impact pointer 348d.

Figure 3:
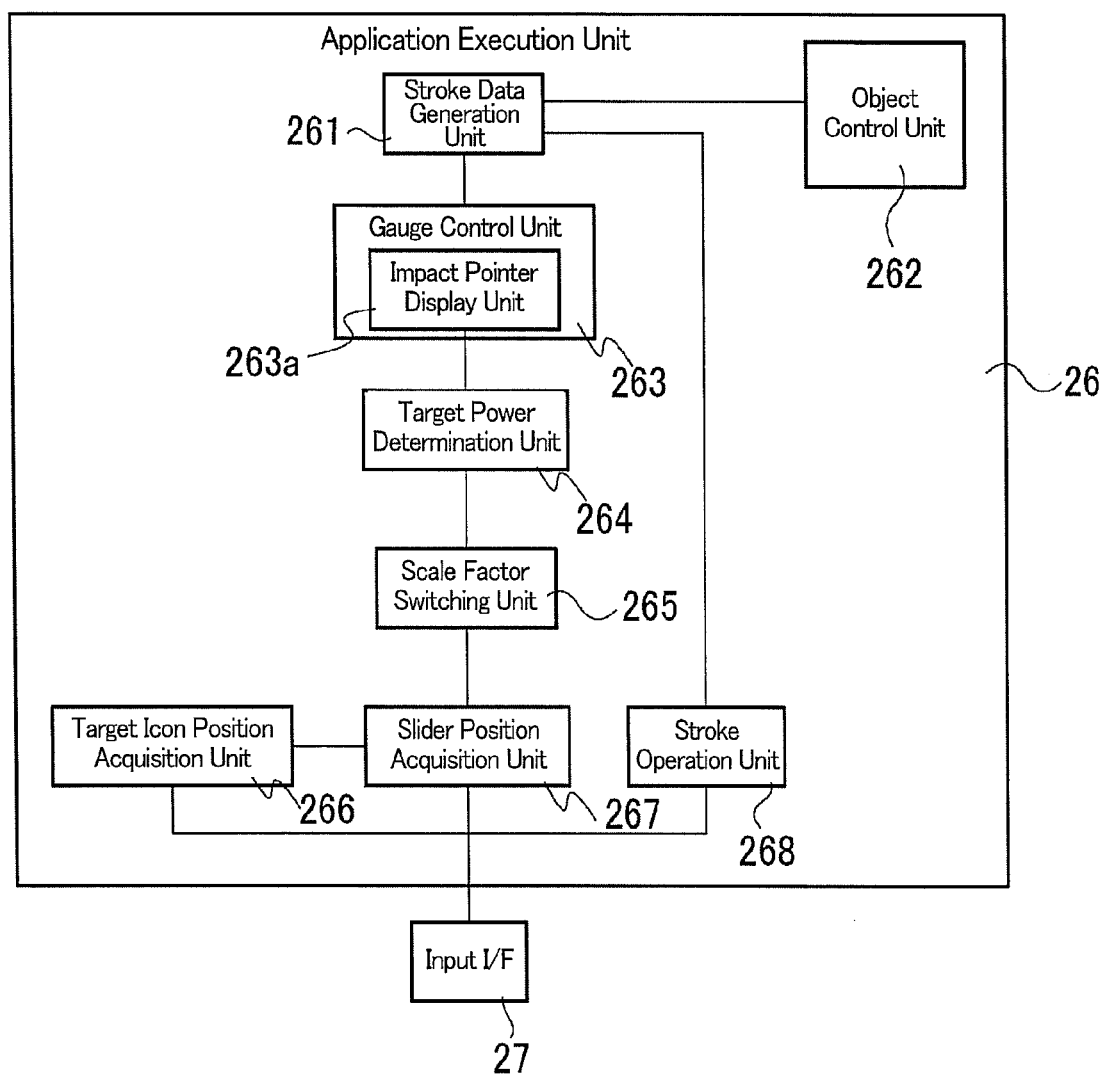
FIG. 3 is a block diagram for showing the configuration of a stroke data input system of the application execution unit 26 in accordance with the embodiment.

In this case, the application execution unit 26 performs the arithmetic operation required for inputting the magnitude of impact on the golf ball 35b, and the game proceeds in accordance with the changing position of the golf ball 35b. FIG. 3 is a block diagram for showing the configuration of a stroke data input system of the application execution unit 26.

Namely, the application execution unit 26 is provided with a target icon position acquisition unit 266, a slider position acquisition unit 267 and a stroke operation unit 268 as a module for acquiring an operation signal input through the input device 27a, and provided with a scale factor switching unit 265, a target power determination unit 264 and an impact pointer display unit 263a as a module for setting a target power.

The target icon position acquisition unit 266 is a module for acquiring the position of a target icon 35c which is moved in the screen. For example, as shown in FIG. 2, the target icon 35c is used when performing a shooting motion as a mark indicative of the position the ball is to reach. The target power can be calculated back from mouse operation in the screen by acquiring the two-dimensional motion of the target icon 35c which is moved in synchronization with the drag and drop operation of the mouse, and assigning the amount of motion to the increment or decrement of the target power. Meanwhile, in this case, the target power may be calculated back from the amount of motion in the virtual space with reference to the x, y and z coordinates of the target icon 35c in the 3D space which are acquired by the target icon position acquisition unit 266.

The slider position acquisition unit 267 is a module for acquiring position information about which of the areas A1 to A3 of the gauge 348c the slider 348a is located in, and the acquired position information of the slider is input to the scale factor switching unit 265. The stroke operation unit 268 is a module for accepting the first click operation indicative of the start of a shot operation and the second click operation indicative of the input of the magnitude of impact. The click operation as acquired is input to the impact pointer display unit 263, which switches the display mode of the gauge (the target power setting mode and the shot operation mode) in accordance with this click operation.

Furthermore, the application execution unit 26 is provided with a gauge control unit 263, a stroke data generation unit 261 and an object control unit 262, as a module for generating stroke data and controlling objects.

The gauge control unit 263 is a module for performing graphic processes such as switching the display type of the gauge 348c and inputting, to the stroke data generation unit 261, the magnitude of impact as input through this gauge 348c. The stroke data generation unit 261 is a module for storing and maintaining, as stroke data, the data relating to the magnitude of impact acquired by the gauge control unit 263 and other data such as the point of striking a ball acquired from the stroke operation unit 268, and outputting the stroke data to the object control unit 262. The stroke data generation unit 261 serves to calculate the magnitude of impact by multiplying the change amount of the gauge (the position of the impact pointer 348d) accepted through the stroke operation unit 268 and the scale factor acquired by the scale factor switching unit 265, and saving the calculation result as stroke data.

The object control unit 262 serves to calculate the flying distance of a ball on the basis of the stroke data as input, and obtaining the coordinates of the ball after flying. The 3D configuration unit 23 constructs a 3D animation on the basis of the coordinates of the ball after flying, and the 2D configuration unit 27 generates a two-dimensional image to be two-dimensionally displayed in each window on the basis of the 3D animation, followed by displaying the two-dimensional image on the display 11 through the display interface 14.

(Input Method of 3D Game Device)

Figure 4:
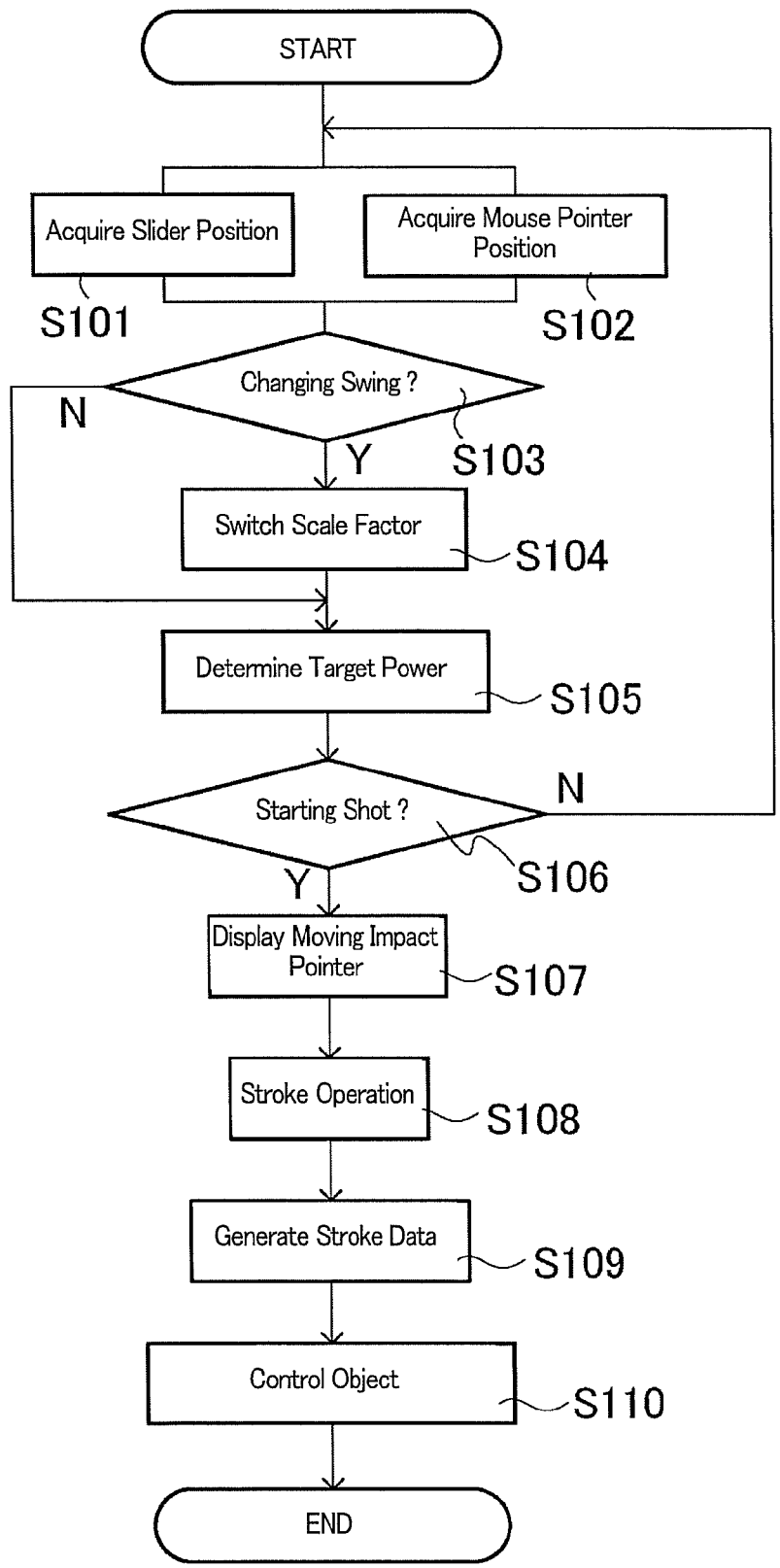
FIG. 4 is a flow chart for showing the input process when performing a shooting motion with the 3D game device in accordance with the embodiment.
Figure 5:
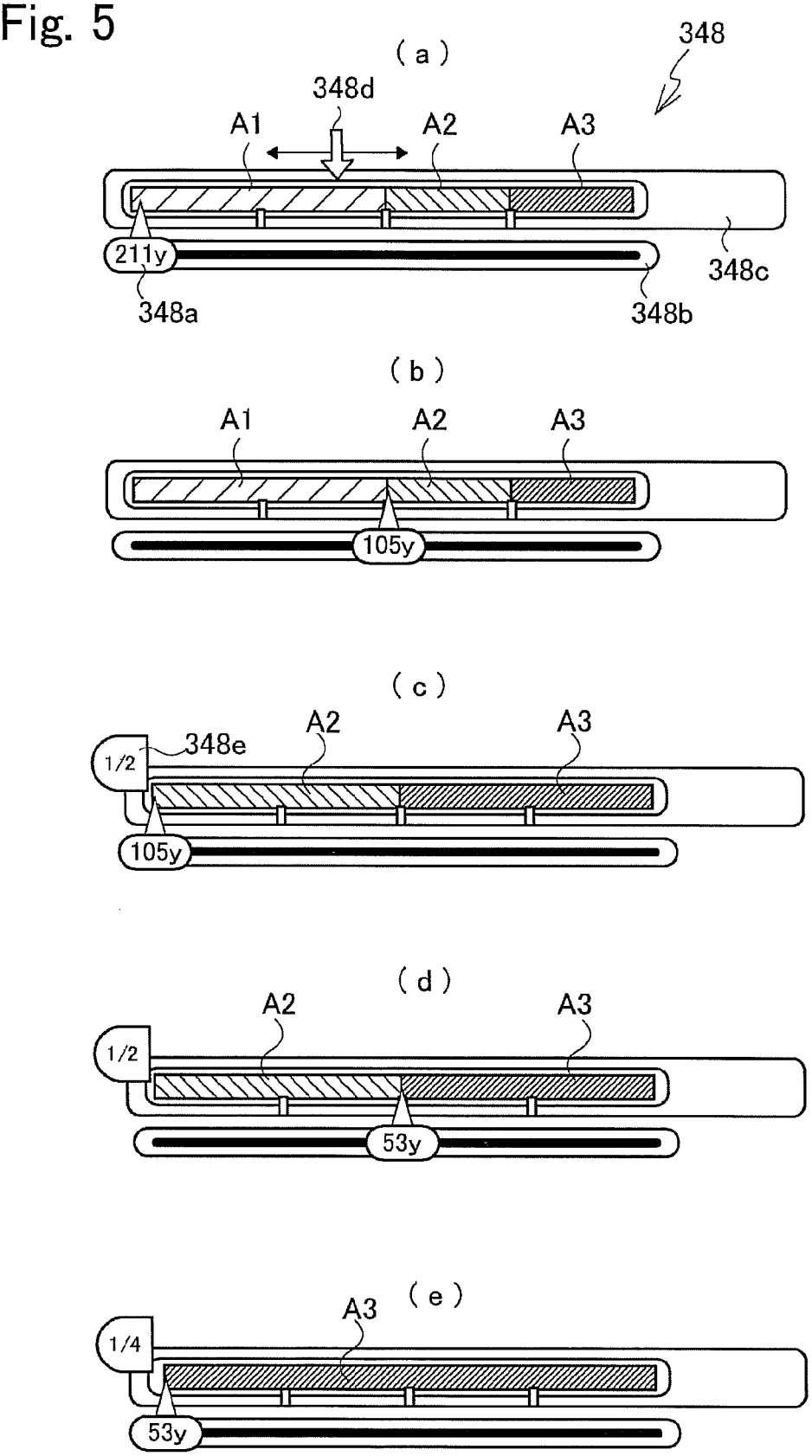
FIG. 5 is an explanatory view for showing the operation of a GUI in accordance with the embodiment.

The input method of the 3D game device in accordance with the present invention can be implemented by operating the 3D game device having the structure as described above. FIG. 4 is a flow chart for showing the input process when performing a shooting motion with the 3D game device in accordance with the present embodiment.

First, in the target power setting mode, the slider position acquisition unit 267 acquires, in step S101, position information about which of the areas A1 to A3 of the gauge 348c the slider 348a is located in, and the acquired position information of the slider is input to the scale factor switching unit 265. Alternatively, in place of this step S101, the position of the slider may be calculated back in step S102 by acquiring the position of the target icon, which is input to the scale factor switching unit 265 as the result of backward calculation.

The scale factor switching unit 265 determines in step S103 whether or not the swing is to be changed in accordance with the position of the slider 348a. If the swing is to be changed (i.e., the "Yes" branch from step S103), the scale factor is switched as well as the display type of the gauge in step S104. On the other hand, if the swing is not to be changed, the scale factor and the display type of the gauge are not switched, and the process proceeds to step S105 in which the target power is determined in accordance with the position of the slider 348a and the scale factor.

Thereafter, in order to enter the shot operation mode, the stroke operation unit 268 acquires the first click operation in step S106. When the first click operation is acquired (i.e., the "Yes" branch from step S106), the operation mode is switched to the shot operation mode in which the impact pointer display unit 263a starts displaying the impact pointer 348d in steps S107. Conversely, if first click operation is not acquired, the target power setting mode is repeated in steps S101 to S105.

After entering the shot operation mode, the impact pointer is continuously moving, and the stroke operation unit 268 is ready to acquire the second click operation. When a stroke operation is performed (as the second click operation), the stroke operation unit 268 acquires the position of the impact pointer in step S108, and the magnitude of impact is calculated by multiplying the position of the impact pointer (motion amount) and the scale factor to generate the stroke data in step S109. The object is controlled (the ball is moved) in step S110 in accordance with the stroke data as generated, followed by finishing the series of operations.

(Input Program)

The device and method of the present invention as described above can be implemented by running an input program written in a predetermined language on a computer. Namely, the system having the functionality as described above can easily be implemented by installing the program in a user terminal, a personal computer such as a Web server, an IC chip and so forth, and running the program on a CPU. This program can be distributed, for example, through a communication line, or as a package application which can be run on a stand-alone computer.

Figure 6:
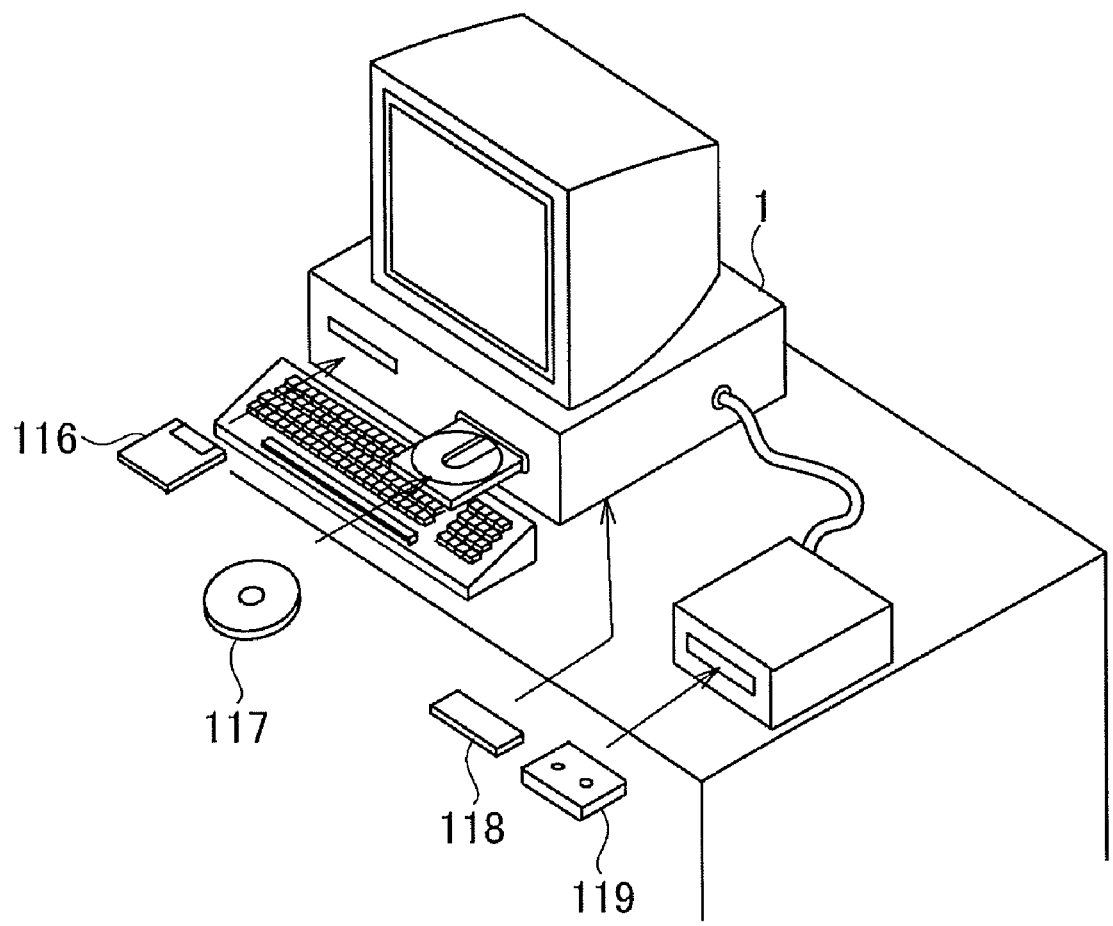
FIG. 6 is a perspective view for showing computer readable mediums in accordance with the embodiment.

Incidentally, this program may be stored in a medium 116 to 119 which can be read by the personal computer 1 as shown in FIG. 6. More specifically speaking, as shown in the same figure, the program may be stored in a variety of recording mediums, for example, a magnetic recording medium such as a flexible disk 116 or a cassette tape 119, or an optical disc such as a CD-ROM or DVD-ROM 117, a RAM card 118 and so forth. The present embodiment is characterized in that a link can be included in content recorded on the CD-ROM or DVD-ROM 117 which is unwritable.

Then, in accordance with the computer readable medium in which the program is stored, the system and method as described above can be implemented with a general purpose computer or a dedicated computer, so that the program can be easily maintained, transported and installed.

(Actions/Effects)

As has been discussed above, in accordance with the present embodiment, it is possible to change the influence of the displacement of the impact pointer 348d upon the magnitude of impact by switching the scale factor through the slider 348a. Namely, it is possible to represent a full shot by increasing the scale factor, and a half or quarter shot by decreasing the scale factor.

Particularly, in the case of the present embodiment, the value of the above scale factor can be switched by moving the position of the slider 348a which is a mark on the gauge indicative of the magnitude of impact. It is therefore possible to select the scale factor corresponding to a full shot or a half shot with reference to the target value of the magnitude of impact such as the flying distance of a ball, and thereby to realize an intuitive operability. In addition, since the impact pointer 348d moves on the gauge 348c at a constant speed in the case of the present embodiment, the influence of the displacement of the impact pointer 348d upon the magnitude of impact can be in proportion to the scale factor, and thereby it is possible to more finely adjust the magnitude of impact by decreasing the scale factor for a half shot or a quarter shot, and realize a realistic operational feeling.

INDUSTRIAL APPLICABILITY

As has been discussed above, in accordance with the present invention, when striking a ball during playing a sports simulation game such as a golf game, it is possible to adjust the magnitude of impact in a more realistic manner, e.g., by making a swing after setting the maximum motion in advance, such as making a half shot.

What is claimed:

1. A game device for proceeding with a game by inputting an operation relating to an object displayed in a screen, comprising:
    a user interface control unit configured to control a graphic user interface which is arranged on the screen and used to display information about the game and input the operation to the game;
    an object control unit configured to change position coordinates of the object in a 3D space in accordance with stroke data which is input on the basis of the operation of the graphic user interface, and
    a target power determination unit indicates a target value of a magnitude of impact by means of a mark on a gauge in the graphic user interface,
    wherein the graphic user interface indicates the magnitude of impact to be input by displaying a graphic which varies with time in order to accept the magnitude of impact,
    the graphic is the gauge which indicates the magnitude of impact by length,
    the gauge is partitioned into a plurality of areas,
    the target power determination unit indicates a slider which moves along the longitudinal direction of the gauge,
    a product of the change amount of the graphic and a scale factor is input through the graphic user interface as the magnitude of impact, and stored in the stroke data, and
    the value of the scale factor and display type of the gauge are switched in steps depending upon which of the areas on the gauge the slider is located in.

2. The game device as claimed in claim 1, wherein the target power determination unit provides the slider which moves along the longitudinal direction of the gauge,
    the display type of the gauge is switched in order that a maximum value of the magnitude of impact corresponds to a maximum displacement of the impact pointer for each scale factor, and
    an impact pointer is moving on the gauge at a constant speed for each scale factor when inputting the magnitude of impact.

3. An input method for inputting an operation through a graphic user interface which is arranged on a screen for use in displaying information about a game and inputting operation to the game, in a game device for proceeding with the game by inputting an operation relating to an object displayed in the screen, comprising:
    switching a value of a scale factor as well as a display type of a graphic in the graphic user interface in accordance with the operation through the graphic user interface;
    displaying a graphic which is displayed in the graphic user interface and varying with time, and accepting a magnitude of impact indicated by the graphic;

saving, as the magnitude of impact of stroke data, the product of a scale factor and a change amount of the graphic at the time when the magnitude of impact is accepted; and changing the position coordinates of the object in a 3D space in accordance with the stroke data, wherein during the switching, a target value of the magnitude of impact is indicated by means of a mark on a gauge in the graphic user interface, the graphic is a gauge which indicates the magnitude of impact by length, the gauge is partitioned into a plurality of areas with a slider which moves along a longitudinal direction of the gauge, and the value of the scale factor and display type of the gauge are switched in steps depending upon which of the areas on the gauge the slider is located in.

4. The input method for inputting an operation as claimed in claim 3 wherein, during the displaying, the change of the gauge indicative of the magnitude of impact is represented by a position of an impact pointer which is a mark indicative of the length of the gauge, the display type of the gauge is switched so that the maximum value of the magnitude of impact corresponds to the maximum displacement of the impact pointer for each scale factor, and when inputting the magnitude of impact, the impact pointer is moving on the gauge at a constant speed for each scale factor.

5. A non-transitory computer readable medium encoded with instructions comprising an input program for inputting an operation through a graphic user interface which is arranged on a screen for use in displaying information about a game and inputting operation to the game, in a game device for proceeding with the game by inputting an operation relating to an object displayed in the screen, the input program causing a computer to perform:

a step for switching the value of a scale factor as well as the display type of a graphic in the graphic user interface in accordance with the operation through the graphic user interface;

a step for displaying a graphic which is displayed in the graphic user interface and varying with time, and accepting a magnitude of impact indicated by the graphic;

a step for saving, as the magnitude of impact of stroke data, the product of the scale factor and a change amount of the graphic at the time when the magnitude of impact is accepted, as the magnitude of impact of stroke data; and a step for changing position coordinates of the object in a 3D space in accordance with the stroke data, wherein, in the step for switching, a target value of the magnitude of impact is indicated by means of a mark on the gauge in the graphic user interface, the graphic is a gauge which indicates the magnitude of impact by length, the gauge is partitioned into a plurality of areas with a slider which moves along a longitudinal direction of the gauge, and the value of the scale factor and display type of the gauge are switched in steps depending upon which of the areas on the gauge the slider is located in.

6. The non-transitory computer readable medium encoded with instructions comprising the input program for inputting an operation as claimed in claim 5 wherein, in the step for displaying, the change of the gauge indicative of the magnitude of impact is represented by a position of the impact pointer which is a mark indicative of the length of the gauge, the display type of the gauge is switched in order that the maximum value of the magnitude of impact corresponds to the maximum displacement of the impact pointer for each scale factor, and when inputting the magnitude of impact, an impact pointer is moving on the gauge at a constant speed for each scale factor.

7. The game device as claimed in claim 1, wherein the target power is calculated back from the amount of motion in the virtual space with reference to coordinates of the target icon in the 3D space which are acquired by a target icon position acquisition unit.

8. The game device as claimed in claim 7, wherein the target power determination unit provides the slider which moves along the longitudinal direction of the gauge, the display type of the gauge is switched in order that a maximum value of the magnitude of impact corresponds to a maximum displacement of an impact pointer for each scale factor, and the impact pointer is moving on the gauge at a constant speed for each scale factor when inputting the magnitude of impact.

9. The input method for inputting an operation as claimed in claim 3, wherein during the switching, the target power is calculated back from the amount of motion in the virtual space with reference to coordinates of the target icon in the 3D.

10. The input method for inputting an operation as claimed in claim 9 wherein, during the displaying, the change of the gauge indicative of the magnitude of impact is represented by a position of an impact pointer which is a mark indicative of the length of the gauge, the display type of the gauge is switched so that the maximum value of the magnitude of impact corresponds to the maximum displacement of the impact pointer for each scale factor, and when inputting the magnitude of impact, the impact pointer is moving on the gauge at a constant speed for each scale factor.

11. The non-transitory computer readable medium encoded with instructions comprising the input program for inputting an operation as claimed in claim 5 wherein the step for switching, the target power is calculated back from the amount of motion in the virtual space with reference to coordinates of the target icon in the 3D.

12. The non-transitory computer readable medium encoded with instructions comprising the input program for inputting an operation as claimed in claim 11 wherein, in the step for displaying, the change of the gauge indicative of the magnitude of impact is represented by a position of an impact pointer which is a mark indicative of the length of the gauge, the display type of the gauge is switched in order that the maximum value of the magnitude of impact corresponds to the maximum displacement of the impact pointer for each scale factor, and when inputting the magnitude of impact, the impact pointer is moving on the gauge at a constant speed for each scale factor.

* * * * *